US011655400B2

(12) United States Patent
Herlfterkamp et al.

(10) Patent No.: US 11,655,400 B2
(45) Date of Patent: May 23, 2023

(54) HOT MELT ADHESIVE FOR POLYOLEFIN FILMS

(71) Applicant: HENKEL AG & CO. KGAA, Duesseldorf (DE)

(72) Inventors: Bernhard Herlfterkamp, Bottrop (DE); Eckhard Puerkner, Duesseldorf (DE); Andy Swain, Chesham (GB); Wolfgang Klingberg, Korschenbroich (DE); Marcel Huebenthal, Haan (DE); Mario Eckers, Wegberg (DE); Stefan Strenger, Essen (DE); Julia Thomas, Wokingham (GB); Oliver Klewe, Langenfeld (DE); Kevin Mills, High Wycombe (GB); Alexander Caspers, Moenchengladbach (DE); Michael Schroettle, Neuss (DE); George Easdown, Church Crookham (GB)

(73) Assignee: HENKEL AG & CO., KGaA, Duesseldorf (DE)

( * ) Notice: Subject to any disclaimer, the term of this patent is extended or adjusted under 35 U.S.C. 154(b) by 517 days.

(21) Appl. No.: 15/493,758

(22) Filed: Apr. 21, 2017

(65) Prior Publication Data

US 2017/0226388 A1 Aug. 10, 2017

Related U.S. Application Data

(63) Continuation of application No. PCT/EP2015/074452, filed on Oct. 22, 2015.

(30) Foreign Application Priority Data

Oct. 23, 2014 (DE) ...................... 10 2014 221 553.6

(51) Int. Cl.
*C09J 123/02* (2006.01)
*C09J 5/00* (2006.01)
(Continued)

(52) U.S. Cl.
CPC .............. *C09J 123/02* (2013.01); *B32B 1/02* (2013.01); *B32B 5/022* (2013.01); *B32B 5/024* (2013.01); *B32B 5/26* (2013.01); *B32B 7/12* (2013.01); *B32B 27/08* (2013.01); *B32B 27/32* (2013.01); *B32B 37/1207* (2013.01); *B65D 65/42* (2013.01); *B65D 85/70* (2013.01); *C08L 23/02* (2013.01); *C08L 23/20* (2013.01); *C09J 5/00* (2013.01); *C09J 7/21* (2018.01); *C09J 7/243* (2018.01); *C09J 7/35* (2018.01); *B32B 2037/1215* (2013.01); *B32B 2255/10* (2013.01); *B32B 2255/26* (2013.01);
(Continued)

(58) Field of Classification Search
CPC ... C09J 123/02; C09J 7/243; C09J 7/35; C09J 7/21; C09J 5/00; C09J 2423/046; C09J 2423/106; B32B 1/02; B32B 5/022; B32B 5/024; B32B 5/26; B32B 27/08; B32B 27/32; B32B 37/1207; B32B 2037/1215; B32B 2255/10; B32B 2255/26; B32B 2323/04; B32B 2323/10; B32B 2439/46; B32B 7/12; B65D 65/42; B65D 85/70; C08L 23/02; C08L 23/20; C08L 2205/025
USPC ........................................................ 524/271
See application file for complete search history.

(56) References Cited

U.S. PATENT DOCUMENTS

| 4,233,432 A | 11/1980 | Curtis, Jr. |
| 5,171,628 A | 12/1992 | Arvedson et al. |

(Continued)

FOREIGN PATENT DOCUMENTS

| CN | 101291964 A | 10/2008 |
| CN | 101506323 A | 8/2009 |

(Continued)

OTHER PUBLICATIONS

Daintith, Ed., "Colophony" and "Rosin," A Dictionary of Chemistry, 6th Ed., Oxford University Press, pp. 135, 465-466 . (Year: 2008).*

(Continued)

*Primary Examiner* — Ling Siu Choi
*Assistant Examiner* — Ronald Grinsted
(74) *Attorney, Agent, or Firm* — Sun Hee Lehmann

(57) ABSTRACT

A hot-melt adhesive composition is disclosed. The hot melt adhesive comprises
a) 25 to 95 wt %, preferably 50 to 85 wt % of at least one polyolefin-based polymer;
b) 1 to 75 wt %, preferably 1 to 40 wt % of at least one tackifying resin;
c) 0 to 15 wt % of at least one plasticizer; and
d) 0 to 30 wt % of at least one additive and/or adjuvant selected from among stabilizers, adhesion promoters, fillers or pigments, waxes, and/or other polymers or combinations thereof,
characterized in that the at least one polyolefin-based polymer is a mixture of:
a1) at least one first polyolefin-based polymer with a molecular weight $M_n$ of <10,000 g/mol in a quantity of 20 to 80 wt % with respect to the total quantity of polyolefin-based polymer, and
a2) at least one second polyolefin-based polymer with a molecular weight $M_n$ of >10,000 g/mol in a quantity of 20 to 80 wt % with respect to the total quantity of polyolefin-based polymer. The adhesive is particularly useful for gluing polyolefin films, woven fabrics, or nonwoven fabrics. Also, methods for manufacturing packaging and fabric with the hot-melt adhesive above are disclosed.

4 Claims, No Drawings

(51) Int. Cl.

| | |
|---|---|
| *B32B 1/02* | (2006.01) |
| *B32B 7/12* | (2006.01) |
| *B65D 65/42* | (2006.01) |
| *B32B 27/32* | (2006.01) |
| *B32B 37/12* | (2006.01) |
| *B32B 5/02* | (2006.01) |
| *B32B 5/26* | (2006.01) |
| *B65D 85/00* | (2006.01) |
| *B32B 27/08* | (2006.01) |
| *C08L 23/02* | (2006.01) |
| *C08L 23/20* | (2006.01) |
| *C09J 7/21* | (2018.01) |
| *C09J 7/24* | (2018.01) |
| *C09J 7/35* | (2018.01) |

(52) U.S. Cl.
CPC ....... *B32B 2323/04* (2013.01); *B32B 2323/10* (2013.01); *B32B 2439/46* (2013.01); *C08L 2205/025* (2013.01); *C09J 2423/00* (2013.01); *C09J 2423/046* (2013.01); *C09J 2423/106* (2013.01)

(56) References Cited

U.S. PATENT DOCUMENTS

| | | | |
|---|---|---|---|
| 5,256,717 | A | 10/1993 | Stauffer et al. |
| 5,331,033 | A | 7/1994 | Stauffer et al. |
| 5,397,843 | A | 3/1995 | Lakshmanan et al. |
| 5,723,546 | A * | 3/1998 | Sustic ............... C08L 23/12 428/343 |
| 6,586,543 | B1 | 7/2003 | Wey et al. |
| 6,833,404 | B2 | 12/2004 | Quinn et al. |
| 6,930,148 | B2 * | 8/2005 | Gipson ............... C08L 21/00 525/191 |
| 7,989,543 | B2 | 8/2011 | Karjala et al. |
| 8,076,422 | B2 | 12/2011 | Heemann et al. |
| 2004/0204529 | A1 | 10/2004 | Gipson |
| 2009/0202847 | A1 | 8/2009 | Eberhardt et al. |
| 2010/0132886 | A1 | 6/2010 | Rodriguez et al. |
| 2010/0256274 | A1 * | 10/2010 | Heemann ............ B32B 27/36 524/271 |
| 2013/0225752 | A1 | 8/2013 | Tse et al. |
| 2015/0225619 | A1 * | 8/2015 | Somers ............... C08K 5/134 524/291 |

FOREIGN PATENT DOCUMENTS

| | | | |
|---|---|---|---|
| EP | 0912646 | B1 | 11/2002 |
| JP | 07026073 | B * | 3/1995 |
| JP | 2004067796 | A * | 3/2004 |
| JP | 2009057397 | A | 3/2009 |
| SU | 732349 | A | 5/1980 |
| WO | 9709393 | A1 | 3/1997 |
| WO | 9803603 | A1 | 1/1998 |
| WO | 0000565 | A1 | 1/2000 |
| WO | 200146277 | A2 | 6/2001 |
| WO | 2005090426 | A1 | 9/2005 |
| WO | 2006102150 | A2 | 9/2006 |
| WO | 2007070091 | A1 | 6/2007 |
| WO | 2008022828 | A1 | 2/2008 |
| WO | 2010026172 | A1 | 3/2010 |
| WO | 2010070046 | A1 | 6/2010 |

OTHER PUBLICATIONS

JP 07-026073 B, machine translation, JPO Japan Platform for Patent Information (J-PlatPat). (Year: 1995).*
JP 2004-067796 A, machine translation, EPO espacenet. (Year: 2004).*
Myers et al., "Polypropylene, atactic," Polymer Data Handbook, 2nd Ed., Oxford University Press, 963. (Year: 2009).*
Miller, "Polypropylene," The Wiley Encyclopedia of Packaging Technology, 3d Ed., John Wiley & Sons. (Year: 2009).*
Eastotac Hydrocarbon Resins Brochure by the Eastman Company (Aug. 1992).
Specialty Polymers for Adhesives and Sealants by the Exxon Chemical Company (Oct. 1990).
Litz, R.J., Developments in Ethylene-Based Hot Melt Adhesives, Adhesives Age 17(8):35-38 (1974).
Clark, T., Bookbinding with Adhesives (3rd ed. McGraw-Hill, UK 1994), p. 1.
Alger, Mark S.M., Polymer Science Dictionary (Elsevier Applied Science, New York 1989), p. 115.
Lee, S.M., Dictionary of Composite Materials Technology (CRC Press, Technology & Engineering 1995), p. 43.
Young, R.J. & Lovell, P.A., Introduction to Polymers (2nd ed., Chapman & Hall, New York 1991), pp. 10-11, 292.
Handbook of Adhesives (ed. Irving Skeist, Van Nostrand Reinhold Co. 1977), pp. 495-498.
Eastman Chemical Brochure titled "World of Eastman Chemicals" dated Jan. 1989, Publication No. P-160F.
Eastman AQ Branched Polyesters Brochure dated Sep. 1997, Publication No. WA-62B.
Eastman Chemical Sales Brochure dated Feb. 1993, Publication No. WA-21.
Exxon Chemical Sales Brochure dated Mar. 1994.
Eastman Chemical Eastotac Hydrocarbon Resins dated Nov. 1994, Publication WA-3C.
Exxon Chemical Escorez Tackifiers Brochure dated Apr. 1992.
Kraus, G., K. W. Rollmann, and R. A. Gray. "Tack and viscoelasticity of block copolymer based adhesives." J. Adhesion (1979): 221-236.
Evans, B.W., "Practical Rubber Compounding and Processing," Springer Dordrecht, Springer Scienec+Business Media B.V., 1981, pp. 162-164.
Xia Yuzheng, et al., "Fine Polymer Chemical Engineering and Application," Chemical Industry Press, p. 161, Sep. 30, 2000.

* cited by examiner

HOT MELT ADHESIVE FOR POLYOLEFIN FILMS

The invention relates to hot-melt adhesives for gluing film-like substrates, woven fabrics, or nonwoven fabrics, particularly polyolefin films, manufactured on the basis of polyolefin-based polymers which, together with other additives, result in hot-melt adhesives with improved migration properties. Furthermore, suitable uses for such hot-melt adhesives and products that contain these adhesives and/or can be manufactured using same are described. The invention further relates to a method for manufacturing packaging made of polyolefin films using the specific hot-melt adhesives of the present invention.

Commercially available bags and pouches made of polyolefins are typically manufactured either through the heat-welding of two plastic webs placed over one another or by gluing two plastic webs placed over one another on the sides (side seam) as well as in the bottom portion (bottom cover sheet).

For many years, pressure-sensitive adhesives based on styrene-isoprene-styrene and styrene-butadiene-styrene rubbers have been used to glue these polyolefin-based materials during the manufacture of bags and pouches.

Because of the difficult-to-glue polyolefin-based material and the stringent requirements with respect to adhesion and cohesion over a wide temperature range from −20 to 80° C., a large quantity of adjuvants must be added to these rubbers in order to improve their adhesion, since the quality of the adhesion is inadequate without such adjuvants. Above all, adhesive resins and oils are used here as adjuvants.

The adhesive resins can be chemically very diverse substances, but they are usually esters of abietic acid (colophony) or terpene phenolic resins. Mineral oils—paraffinic oils on the one hand and so-called naphthenic oils on the other—have proven to be especially suitable for achieving a sufficiently soft and surface-tacky film of these rubber adhesives.

However, the rubber adhesives that have been previously used are disadvantageous in many respects. For one, they require large quantities of special resins that are based on petroleum raw materials whose availability is often limited. Moreover, the synthesis of these resins is expensive. In light of these facts, these resins are disadvantageous with respect to their cost. Furthermore, they have a characteristic intrinsic odor that can be passed on to the contents of the bags/pouches, which is unwelcome particularly in the food industry.

What is more, the oils used also have serious drawbacks. Similar to the resins, they are based on crude oil and are therefore already disadvantageous in terms of cost and dwindling resources. Moreover, they contain a large number of compounds, particularly including polycyclic aromatic fractions, that are passed on to the filled product and therefore pose a high hazard potential for the consumer, particularly in the food and pharmaceutical sector. It is especially disadvantageous in this context that, due to their low molecular weight and low polarity even at room temperature, the oils are very low-viscosity liquids and therefore retain a high migration capacity, even when mixed with resins and polymers. This ability to migrate refers both to the penetration of the glued materials and to penetration into the filled product.

A need therefore exists for additional adhesives in which the use of such adjuvants can be reduced or even avoided entirely in order to ensure greater product safety for consumers. At the same time, however, the adhesives used should have an adhesive effect (adhesion/cohesion) and flexibility that are comparable to those of the known adhesives.

The present invention solves this problem through the provision of novel adhesives, particularly hot-melt adhesives, based on polyolefin-based polymers.

1. In a first aspect, the invention therefore relates to a hot-melt adhesive containing a) 25 to 95 wt %, preferably 50 to 85 wt % of at least one polyolefin-based polymer;

b) 1 to 75 wt %, preferably 1 to 40 wt % of at least one tackifying resin;

c) 0 to 15 wt % of at least one plasticizer; and d) 0 to 30 wt % of at least one additive and/or adjuvant selected from among stabilizers, adhesion promoters, fillers or pigments, waxes, and/or other polymers or combinations thereof, characterized in that the at least one polyolefin-based polymer is a mixture of:

a1) at least one first polyolefin-based polymer with a molecular weight $M_n$ of <10,000 g/mol in a quantity of 20 to 80 wt % with respect to the total quantity of polyolefin-based polymer, and a2) at least one second polyolefin-based polymer with a molecular weight $M_n$ of >10,000 g/mol in a quantity of 20 to 80 wt % with respect to the total quantity of polyolefin-based polymer.

In another aspect, the invention also relates to the use of the hot-melt adhesives according to the invention for gluing film-like substrates, particularly polyolefin films, woven fabrics, or nonwoven fabrics.

Another aspect of the invention relates to methods for manufacturing packaging made of polyolefin films, particularly pouches made of polyolefins, comprising the partial-surface adhesion of at least two polyolefin films in the form of longitudinal and/or bottom gluing, with the hot-melt adhesive according to the invention being used for gluing. The invention also relates to a method for manufacturing glued woven fabric or nonwoven fabric, comprising the partial- or full-surface gluing of at least two substrates, characterized in that at least one substrate is a woven fabric or a nonwoven fabric, and that the hot-melt adhesive according to the invention is used for the gluing.

Finally, in yet another aspect, the invention also relates to packaging make of polyolefin films, particularly pouches or bags, which comprise one or more films made of polyolefins that can be obtained according to the methods according to the invention.

These and other aspects, features, and advantages of the invention will become apparent to a person skilled in the art through the study of the following detailed description. Any feature from one aspect of the invention can be used in any other aspect of the invention. Furthermore, it will readily be understood that the examples contained herein are intended to describe and illustrate but not to limit the invention and that, in particular, the invention is not limited to these examples. Unless indicated otherwise, all percentages indicated are percent by weight. Numerical ranges that are indicated in the format "from x to y" also include the cited values. If several preferred numerical ranges are indicated in this format, it is self-evident that all ranges that result from the combination of the various endpoints are also included.

Unless indicated otherwise, the molecular weights indicated in the present text refer to the number average of the molecular weight ($M_n$). The molecular weight $M_n$ can be determined based on an end-group analysis (hydroxy number according to DIN 53240-1:2013-06), or by means of gel permeation chromatography (GPC) according to DIN 55672-1:2007-08 with THF as an eluent. Except where indicated otherwise, the listed molecular weights are those which are determined by means of GPC. The weight average of the molecular weight $M_w$ can also be determined by means of GPC, as indicated previously.

As used herein, "at least one" refers to 1 or more, i.e., 1, 2, 3, 4, 5, 6, 7, 8, 9, or more. In relation to an ingredient, the expression refers to the type of ingredient and not to the absolute number of molecules. "At least one resin" therefore means at least one type of resin, for example—that is, that one type of resin or a mixture of several different resins can be used. Together with weight data, the expression refers to all compounds of the indicated type that are contained in the composition/mixture, that is, that the composition does not contain any other compounds of this type beyond the indicated quantity of the corresponding compounds.

The hot-melt adhesives of the present invention contain at least one polyolefin-based polymer, with the polymer containing, with respect to its total weight, 20 to 80 wt % of at least one first polyolefin-based polymer with a molecular weight $M_n$ of <10,000 g/mol and 20 to 80 wt % of at least one second polyolefin-based polymer with a molecular weight $M_n$ of >10,000 g/mol, with the sum being 100%. In a more preferred embodiment, the hot-melt adhesive of the present invention contains at least one polyolefin-based polymer, with the polymer containing, with respect to its total weight, 50 to 80 wt % of at least one first polyolefin-based polymer with a molecular weight $M_n$ of <10,000 g/mol and 20 to 50 wt % of at least one second polyolefin-based polymer with a molecular weight $M_n$ of >10,000 g/mol, with the sum being 100%.

In preferred embodiments, in the hot-melt adhesive according to the invention, the $M_n$ of a1) is <10,000 g/mol and the $M_n$ of a2) is >25,000 g/mol; more preferably, the $M_n$ of a1) is <9,000 g/mol and the $M_n$ of a2) is >50,000 g/mol, and, most preferably, the $M_n$ of a1) is <8,000 g/mol and the $M_n$ of a2) is >100,000 g/mol. In other preferred embodiments, in addition to the abovementioned ranges, the lower limit for a1) is 1,000 g/mol and the upper limit for a2) is 500,000 g/mol.

As polyolefin-based polymers, homo- and copolymers of polyolefins are especially preferably selected from the group consisting of poly-α-olefins, preferably atactic poly-α-olefins (APAO) based on ethylene, propene, and/or butene, and ethylene/α-olefin and propylene/α-olefin copolymers, preferably copolymers of ethylene and propene, 1-butene, 1-hexene, 1-octene, or a combination thereof.

The copolymers that are suitable according to the invention can be block copolymers, and the blocks can optionally have a different monomer composition.

In preferred embodiments, the polyolefin-based polymers are characterized in that they have a narrow molecular weight distribution. The molecular weight distribution expressed as $M_W/M_N$ should preferably be 2.5, more preferably less than 2.3. Such polymers are known in the literature and can be obtained commercially from various manufacturers.

Suitable copolymers of ethylene/propylene together with at least one ($C_3$ bis $C_{20}$)-α-olefin monomer, particularly metallocene-catalyzed polymers, are described in patent applications EP 0912646 A1, WO 00/00565 A1, WO 2001/46277 A2, WO 2006/102150 A2, WO 2005/090426 A1, WO 2010/026172 A1, and WO 2010/070046 A1, for example, as well as in U.S. Pat. No. 6,586,543 B1. Such copolymers are commercially available, for example olefin block copolymers under the trade names Infuse™ (Dow Chemical Corporation), particularly Infuse™ 9807 or 9808 or Queo™ (Borealis), particularly Queo™ 8230. Other suitable olefin plastomers can also be obtained under the trade names Vistamaxx™ (Exxon) and Affinity™ (Dow Chemical Company). The poly-α-olefins available from Evonik under the trade name Vestoplast® are also suitable according to the invention.

A hot-melt adhesive according to the invention also contains at least one resin. The resin is intended to tackify the base polymer. It is generally used in a quantity from 1 to 75 wt %, in particular from 1 to 40 wt %, with respect to the total weight of the hot-melt adhesive. It is preferred according to the invention for the quantity of resin used to be selected so as to be as little as possible, for example in the range from 1 to 10 wt % with respect to the total weight of the hot-melt adhesive.

In principle, the known resins such as, for example, aromatic, aliphatic, or cycloaliphatic hydrocarbon resins, each also in fully or partially hydrated form, as well as modified or hydrated natural resins can be used. Suitable resins that can be used in the context of the invention include cycloaliphatic hydrocarbon resins, terpene resins such as terpolymers or copolymers of terpene, natural resins based on colophony or tall oil resin, including derivatives thereof such as, for example, methyl, pentaerythritol, or glycerin esters thereof, other modified natural resins such as resin acids from balsamic resin, tali oil resin, or root resin, optionally also hydroabietyl alcohol and esters thereof, acrylic acid copolymers such as styrene-acrylic acid copolymers or copolymers of ethylene, acrylate esters, and maleic anhydride, or resins based on functional hydrocarbon resins.

Natural resin based on colophony or tall oil resin are obtained particularly from conifers as a byproduct of paper manufacturing. Colophony resin is typically a mixture of 8 resin acids, namely abietic acid, neoabietic acid, dehydroabietic acid, palustric acid, levopimaric acid, pimaric acid, isopimaric acid, and sandaracopimaric acid. The resin can be modified by hydrogenation, esterification, preferably with alcohols, such as methanol, triethylene glycol, glycerin, and pentaerythritol, dimerization, and functionalization. Functionalization preferably refers to the further esterification of the polyol esters, such as those mentioned above, with diacids such as maleic or fumaric acid. Suitable resins can be obtained under the trade names Sylvatac® (Arizona Chemical), particularly Sylvatac® RE85, Staybelite™ A rosin acid (Pinova Inc.), Staybelite™ E rosin ester (Eastman), and PEXALYN® T100 (Pinova Inc), for example.

The at least one tackifying resin can be a single resin or, preferably, a mixture of the abovementioned resins.

In various embodiments, the resin comprises a fully or partially hydrated hydrocarbon resin and/or at least one natural resin based on colophony or tall oil resin, or a methyl, pentaerythritol, or glycerin ester, or a combination thereof. In particular, the at least one fully or partially hydrated hydrocarbon resin can be a cycloaliphatic resin, an aromatically modified resin, a polyterpene, a terpene phenolic resin, a 1,3-pentadiene resin, a cyclopentadiene resin, a 2-methyl-2-butene copolymer, or a derivative or a combination of the above.

One exemplary mixture consists of aromatically modified $C_5$ hydrocarbon resins with a softening point between 95 and 105° C., such as those which are commercially available under the trade name Wingtack™ Extra Flakes (Cray Valley, USA), for example, and aromatically modified, hydrated $C_9$ hydrocarbon resins that are liquid at room temperature, such as those which are commercially available under the trade name Regalite™ R (Eastman, USA), for example.

In general, resins or resin mixtures are preferably used which have a softening point from 80 to 130° C. Another special embodiment uses resins having a softening point below 50° C.; in particular, these can also be liquids.

The softening point is determined using the Ring & Ball method (ASTM method E28; ISO 4625).

Another component that can be contained in the hot-melt adhesive is plasticizers These can be generally selected from among mineral oils, poly(iso)butylene, and liquid or pasty hydrated hydrocarbons. They are preferably hydrated hydrocarbons with a consistency number of 000, 00, 0, 1, 2, 3, 4, or 5 according to DIN 51818.

Suitable plasticizers include but are not limited to medical white oils, naphthenic mineral oils, polypropylene, polyisobutylene, and polyisoprene oligomers, hydrated polyisoprene and/or polybutadiene oligomers, benzoate esters, phthalates, adipates, plant or animal oils, and derivatives thereof. Hydrated plasticizers are selected from the group of the paraffinic hydrocarbon oils, for example. Polypropylene glycol and polybutylene glycol, as well as polymethylene glycol are also suitable. Esters such as liquid polyesters and glycerin esters, for example, can also be used as plasticizers. The molecular weight $M_w$ of polybutylene oligomers should preferably lie in the range from 200 to 6,000 g/mol, and polyolefins should have a molecular weight $M_w$ up to about 2,000 g/mol, particularly up to 1,000 g/mol. In particular, poly(iso)butylenes and liquid or pasty hydrated hydrocarbons are suitable. Polyisobutylene with a molecular weight $M_w$ of less than 5000 is very especially preferred. In various preferred embodiments, the adhesive according to the invention is free of plasticizers and/or the plasticizer component is free of mineral oils, particularly paraffinic and/or naphthenic oils, and aromatic hydrocarbons.

In the present invention, "free of" means that the concentration of the corresponding component is <0.1 wt %, preferably <0.01 wt % with respect to the total weight of the composition.

The quantity of plasticizers should be between 0 to a maximum of 15 wt %. An excessive plasticizer fraction can result in reduced cohesive characteristics of the adhesive.

Optionally, waxes can be added to the hot-melt adhesive in quantities from 0.5 to 5 wt %. The quantity is gauged such that the viscosity is reduced to the desired range while not negatively influencing the adhesion. The wax can be of natural origin, or it can also be in a chemically modified form or of synthetic origin. Plant waxes, animal waxes, mineral waxes, or petrochemical waxes can be used as natural waxes. Hard waxes such as montan ester waxes, sasol waxes, etc. can be used as chemically modified waxes. Polyalkylene waxes as well as polyethylene glycol waxes are used as synthetic waxes. Preferably, petrochemical waxes such as petrolatum, paraffin waxes, microcrystalline waxes, and synthetic waxes are used. Paraffinic and/or microcrystalline waxes and/or hydrated versions thereof are especially preferred, particularly polypropylene or polyethylene wax with a dropping point determined according to ASTM D-3954 from 50° C. to 170° C.

Besides the abovementioned components, the hot-melt adhesives according to the invention can contain other components that are usually used in hot-melt adhesives as additives. These include stabilizers, adhesion promoters, antioxidants, fillers, and/or pigments, for example. In this way, certain characteristics of the adhesive, such as its cohesion, stability, adhesion, or strength, for example, can be influenced. The quantity of additives and adjuvants can be preferably 0 to 3 wt %. Especially preferred additives include stabilizers against the thermal and oxidative degradation and breakdown resulting from UV radiation.

Additives such as stabilizers or adhesion promoters are known to a person skilled in the art. These are commercial products, and a person skilled in the art can select them according to the desired characteristics. It must be ensured that there is compatibility with the polymer blend. For example, antioxidants that are available under the trade name Irganox® (BASF SE) can be used as stabilizers, preferably in quantities from 0.5 to 1 wt % with respect to the composition.

As an optional component, the hot-melt adhesive according to the invention can contain 0 to 8 wt %, particularly 2 to 5 wt %, of additional polymers that are different from the copolymers according to the invention. In particular, the quantity of these polymers should be less than the quantities of the olefinic polymers required according to the invention. These polymers can improve various application-related characteristics of the hot-melt adhesive, such as thermal stability under load, low-temperature flexibility, cohesion, and adhesion of the applied adhesive. These additional polymers preferably have no groups that crosslink under the manufacturing and storage conditions.

In other embodiments, the hot-melt adhesive can therefore additionally contain at least one elastic polymer based on olefins and (meth)acrylic acid esters that has carboxyl groups and/or anhydride groups. The olefin monomers can be selected from the known $C_2$ to $C_5$ olefins, particularly ethylene or propylene. The (meth)acrylic acid esters are selected from (meth)acrylic esters with low-molecular $C_1$ to $C_8$ alkanols; in particular, methyl (meth)acrylate, ethyl (meth)acrylate, propyl (meth)acrylate, butyl (meth)acrylate, or 2-ethylhexyl(meth)acrylate are suitable individually or in mixture. The copolymer must also have carboxyl groups and/or anhydride groups. This can occur through polymerization with corresponding functional monomers or through subsequent modification of the polyolefin copolymer. For example, it is possible to introduce COOH groups through oxidation. Moreover, it is possible to introduce COOH or anhydride groups into the polymer through radical grafting reactions, for example with maleic anhydride, COOH, or anhydride groups. Terpolymers from ethylene, acrylic acid ester, and maleic anhydride with a melt flow index of 100-300/10 minutes at 190° C. and a test load of 2.6 kg (according to ISO 1133) are especially preferred.

Such polymers usually have a molecular weight ($M_n$) between 3,000 and 50,000 g/mol, particularly 8,000 to 25,000 g/mol. The quantity of the COOH/anhydride groups is particularly between 1 to 100 mg KOH/g, especially preferably between 5 to 50 mg KOH/g. If the number of carboxyl groups is high, then the compatibility of the components of the hot-melt adhesive is problematic. The softening point can lie in the range from 50° C. to 150° C., particularly from 90 to 110° C. The quantity of the polymer bearing COOH groups should be between 0 to 15 wt %, particularly between 0.5 to 10 wt %. Suitable polymers having carboxyl groups are commercially available and known to a person skilled in the art.

While the elastic polymers influence the flexibility of the hot-melt adhesive, the cohesion can be improved by fractions of additional, non-flexible thermoplastic polymers. In particular, the known thermoplastic polymers such as EVA and high-molecular polyolefins such as poly-1-butene are suitable.

In preferred embodiments, the hot-melt adhesive is free of polycyclic-aromatic hydrocarbons.

The hot-melt adhesive according to the invention is manufactured by means of known methods by mixing in the melt. All of the components can be put in, heated and then homogenized at the same time, or the more easily melting components are put in first and mixed, followed by the harder resin components. It is also possible and preferred for the hot-melt adhesive to be manufactured continuously in an extruder. The suitable hot-melt adhesive is solid and, with the exception of impurities, free of solvents.

The hot-melt adhesive that is suitable according to the invention preferably has a viscosity of about 500 mPas to 100,000 mPas, especially preferably 5,000 to 20,000, measured at 160° C. (Brookfield RVT, spindle 27). It is also preferred that it have a softening point (Ring & Ball, ASTM E 28) of greater than 70° C., particularly greater than 80° C.

The hot-melt adhesives described herein are particularly suitable for gluing film-like substrates, preferably as hot-melt adhesives for gluing at least two film webs, more preferably in the form of side or bottom seams. Another preferred possibility for manufacturing the film containers consists in folding a single film sheet or a single film web, e.g., by means of a mandrel, and gluing together the film portions resulting from the folding at least in portions, preferably on at least one edge region. For example, if a film web is folded and the film portions created in this way are glued together along the entire length of the film web, a film tube is produced which is then cut at a right angle to the longitudinal axis of the film web, for example, and can be optionally glued in another edge region.

A wide variety of film packaging, such as bags or pouches, for example, can be produced in this way. The hot-melt adhesives of the present invention are also suitable for gluing woven fabrics or nonwoven fabrics.

As material for these film-like substrates, which are used inter alia in bags and pouches, polyolefin is preferably used, particularly polyethylene (PE) and polypropylene (PP), with it being possible to use this as a web material or in another form of packaging with or without surface treatment or coating. Surface-pretreated materials include PE and PP, for example, and the pretreatment can involve corona treatments or related techniques for increasing the surface tension or precoats of the polyolefin with acrylates. Alternatively, other pretreatments such as with gas flames or ethylene vinyl acetate (EVA) coatings, for example, are also conceivable.

The usual adjuvants can be mixed in with the polyolefin film material. These adjuvants are used in order to produce better printability, to produce an antistatic effect, to ensure unrollability as a roll material, etc. However, all of these materials have the corresponding polyolefin as a main component, i.e., at least 80 wt % with respect to the total weight of the polyolefin film material.

Various techniques and methods can be used to enable such film bags and pouches to be produced. For example, pressure coating, coextrusion coating, flat-film coextrusion, and blown-film coextrusion are suitable (see *Plastics Extrusion Technology*, Friedhelm Hensen (editor), Carl Hanser Verlag Munich, 1988).

For the longitudinal and bottom gluing, the technologies known to a person skilled in the art for this purpose can be used, such as application using nozzles, wheels, or printing blocks.

To enable their use for adhesive-related purposes, the adhesives of the invention are preferably present in the form of pads or granulate which was itself produced through extrusion at high temperature and subsequent cutting, particularly strand cutting (after cooling, for example by means of cold water).

In the case of especially tacky products, it can be advantageous to pack the adhesive in silicone paper or an appropriate plastic film. During the manufacture of the packaging, the hot-melt adhesive of the invention can be applied between at least two materials.

One aspect of the invention is aimed at such packaging, particularly for foodstuffs, that the described glued films contain.

As already described several times above, the packaging can be in the form of a bag or pouch. Packaging that is manufactured in this way can be used for numerous applications: for example, as food packaging, particularly for breads, baked goods, confectioneries, spices, tea, coffee, cheese, sausage, and such foods that are heated in the oven or microwave before consumption. Such packaging is also suitable for medicaments, towelettes, cleaning cloths, etc., it being possible for the cleaning emulsions or cosmetically active substances to be added to the cloths.

The following examples are intended to explain the invention, but the invention is not limited by them.

EXAMPLES

Example 1: Adhesive Formulation

In the following, the term "hydrocarbon resin" is also referred to as "HC resin."

The glass transition temperature $T_g$ was determined according to DIN EN 1427.

The melt viscosity was determined according to DIN 53019.

The molecular weight $M_n$ was determined according to DIN 55672, as described above.

Adhesive compositions were prepared which contained the following components in relation to the composition:

| Formulation 1: | |
|---|---|
| Poly-α-olefin ($M_n$ 5,000 g/mol; $T_g$ 96° C.; melt viscosity 2,500 mPas) | 70.0 wt % |
| Poly-α-olefin ($M_n$ 18,100 g/mol; $T_g$ 107° C.; melt viscosity 50,000 mPas) | 15.0 wt % |
| Escorez 5400 (DownMobil Chemical), cycloaliphatic HC resin | 5.0 wt % |
| Polybut 10 (Productos Uhpon), polyisobutylene | 9.5 wt % |
| Irganox 1010 (BASF SE), antioxidant | 0.5 wt % |

The product obtained in this way exhibited very good adhesion on polyolefin-based bag material in conjunction with a very high level of cohesion.

| Formulation 2: | |
|---|---|
| Poly-α-olefin ($M_n$ 5,000 g/mol; $T_g$ 96° C.; melt viscosity 2,500 mPas) | 70.0 wt % |
| Poly-α-olefin ($M_n$ 18,100 g/mol; $T_g$ 107° C.; melt viscosity 50,000 mPas) | 15.0 wt % |
| Sylvatac RE 85 (Arizona Chemical), colophony glycerol ester | 5.0 wt % |

-continued

| Formulation 2: | |
|---|---|
| Polybut 10 (Productos Uhpon) polyisobutylene | 9.5 wt % |
| Irganox 1010 (BASF SE), antioxidant | 0.5 wt % |

The product obtained in this way had even greater adhesion than formulation 1.

| Formulation 3: | |
|---|---|
| Poly-α-olefin ($M_n$ 5,000 g/mol; $T_g$ 96° C.; melt viscosity 2,500 mPas) | 15.0 wt % |
| Poly-α-olefin ($M_n$ 18,100 g/mol; $T_g$ 107° C.; melt viscosity 50,000 mPas) | 40.0 wt % |
| Regalite S1100 (Eastman Chemical Company), cycloaliphatic HC resin | 29.5 wt % |
| Polybut 10 (Productos Uhpon), polyisobutylene | 12.0 wt % |
| Polybut 30 (Productos Uhpon), polyisobutylene | 3.0 wt % |
| Irganox 1010 (BASF SE), antioxidant | 0.35 wt % |
| Irganox PS 802 FL (BASF SE), antioxidant | 0.15 wt % |

This adhesive had a viscosity of about 11,300 mPas at 160° C. (Brookfield RVT spindle 21) and a softening point of 87.8/87.9° C. (ASTM E 28). With a 50 μm PET coating in a quantity of 40 g/m² with a heating table/heating blade at 150° C. adhesive temperature, the adhesive exhibited an adhesive bond on steel and PE after 20 minutes of 31 and 15 N/25 mm, respectively, and of 33 and 32 N/25 mm on steel and glass, respectively, after 24 h. After regluing (130° C., 30 seconds, 5 kg/100 cm²), adhesive bonds on steel and PE and glass of 35 (70% adhesion failure) and 17 and 24 N/25 mm, respectively, were achieved after 24 h.

| Formulation 4: | |
|---|---|
| Poly-α-olefin ($M_n$ 5,000 g/mol; $T_g$ 96° C.; melt viscosity 2,500 mPas) | 15.0 wt % |
| Poly-α-olefin ($M_n$ 18,100 g/mol; $T_g$ 107° C.; melt viscosity 50,000 mPas) | 35.0 wt % |
| Regalite R1010 (Eastman Chemical Company), cycloaliphatic HC resin | 5.0 wt % |
| Regalite S1100 (Eastman Chemical Company), cycloaliphatic HC resin | 29.6 wt % |
| Polybut 10 (Productos Uhpon), polyisobutylene | 12.0 wt % |
| Polybut 30 (Productos Uhpon), polyisobutylene | 3.0 wt % |
| Irganox 1010 (BASF SE), antioxidant | 0.35 wt % |
| Irganox PS 802 FL (BASF SE), antioxidant | 0.15 wt % |

This adhesive had a viscosity of about 7500 mPas at 160° C. (Brookfield RVT, spindle 21) and a softening point of 85.2/85.4° C. (ASTM E 28). With a 50 μm PET coating in a quantity of 40 g/m² with a heating table/heating blade at 150° C. adhesive temperature, the adhesive exhibited an adhesive bond on steel and PE and glass after 20 minutes of 23 and 17 and 26 N/25 mm, respectively, and of 37 and 8 and 41 N/25 mm (50% adhesion failure) on steel and PE and glass, respectively, after 24 h. After regluing (130° C., 30 seconds, 5 kg/100 cm²), adhesive bonds on steel and PE and glass of 35 (80% adhesion failure) and 23 and 37 N/25 mm (80% cohesive failure), respectively, were achieved after 24 h.

The invention claimed is:

1. A hot-melt adhesive consisting of:
    a) 25 to 95 wt % of a mixture of atactic polyolefin-based polymers of
        a1) 20 to 80 wt %, based on the mixture of polyolefin-based polymer, of a first atactic poly-α-olefin, which is an (i) ethylene/α-olefin with propene, 1-butene, 1-hexene, or 1-octene comonomer; or (ii) propylene/α-olefin with ethylene, 1-butene, 1-hexene, or 1-octene comonomer; having a molecular weight $M_n$ of <10,000 g/mol and a first glass transition temperature, and
        a2) 20 to 80 wt %, based on the mixture of polyolefin-based polymer, of a second atactic poly-α-olefin, which is an (i) ethylene/α-olefin with propene, 1-butene, 1-hexene, or 1-octene comonomer; or (ii) propylene/α-olefin with ethylene, 1-butene, 1-hexene, or 1-octene comonomer; having a molecular weight $M_n$ of >10,000 g/mol and a second glass transition temperature;
    b) 1 to 75 wt % of at least one tackifying resin;
    c) 0 to 15 wt % of at least one poly(iso)butylene having a molecular weight $M_w$ of less than 5,000 g/mol and free of naphthenic oils; and
    d) 0 to 30 wt % of at least one additive and/or adjuvant selected from stabilizers, adhesion promoters, fillers or pigments, waxes, or combinations thereof
    wherein the hot-melt adhesive has a viscosity range of 5,000 to 11,300 mPas, measured at 160° C. with a Brookfield CAP, spindle 27 and
    wherein the hot-melt adhesive has a softening point of 70-87.9° C. as measured in accordance with ASTM E 28.

2. The hot-melt adhesive as set forth in claim 1, wherein, the tackifying resin is a natural resin based on colophony resin or tall oil resin.

3. The hot-melt adhesive as set forth in claim 1, wherein, the tackifying resin is a fully or partially hydrated hydrocarbon resin, which is a cycloaliphatic resin, an aromatically modified resin, a polyterpene, a terpene phenolic resin, a 1,3-pentadiene resin, a cyclopentadiene resin, a 2-methyl-2-butene copolymer, or a derivative thereof.

4. The hot-melt adhesive as set forth in claim 1, wherein, in that the at least one additive and/or the adjuvant is a stabilizer.

\* \* \* \* \*